UNITED STATES PATENT OFFICE.

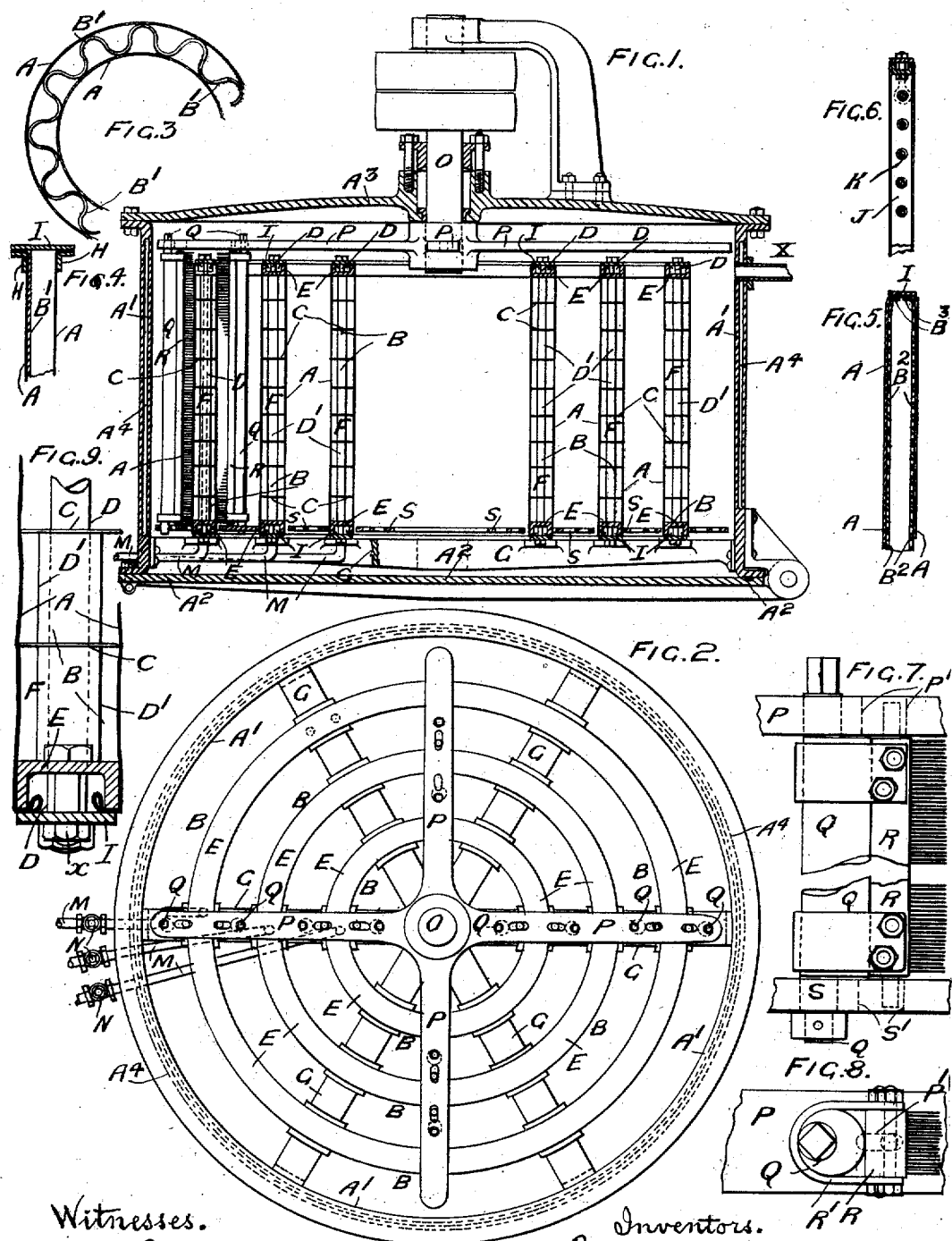

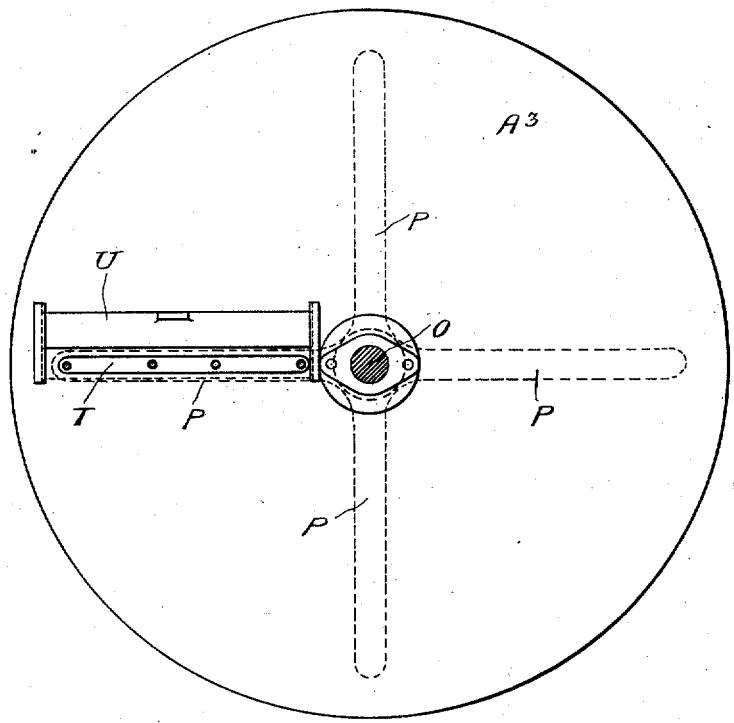

DAVID BLACK, OF SHETTLESTON, AND JAMES McLUCKIE WRIGHT, OF GLASGOW, SCOTLAND.

FILTERING APPARATUS.

SPECIFICATION forming part of Letters Patent No. 651,621, dated June 12, 1900.

Application filed August 11, 1898. Serial No. 688,355. (No model.)

*To all whom it may concern:*

Be it known that we, DAVID BLACK, a resident of 12 Huntly Terrace, Shettleston, county of Lanark, and JAMES McLUCKIE WRIGHT, a resident of 13$^a$ Shamrock street, in the city of Glasgow, Scotland, citizens of the United Kingdom of Great Britain and Ireland, have invented new and useful Improvements in Filtering Apparatus, (which has been patented in Great Britain by Letters Patent, dated the 13th of January, 1898, No. 964,) of which the following is a specification.

This invention, which relates to filter-presses and similar filtering apparatus for filtering liquids, juices, and the like, has for its object the simplifying of the construction of the various parts of the filter and the provision of means for cleaning the filter cloth or cloths or other filtering media when such becomes clogged.

The invention is illustrated by the accompanying drawings.

Figure 1 is a vertical section, and Fig. 2 a plan with the cover removed, of the improved filtering apparatus. Figs. 3 to 9 are detail views of parts of the apparatus, some of which are drawn to a larger scale for clearness; and Figs. 10 and 11 are respectively a side view in central vertical section and a top plan view of the top of the casing of such filtering device.

In carrying out the invention we arrange within a metal casing A', formed with a steam-jacket, as at A$^4$, a series of filtering-cylinders, each of which consists, preferably, as shown at Figs. 1, 2, and 9, of a skeleton cylinder B, covered on its inner and outer surfaces with cloths A, which are thus arranged in pairs. The cylinders are composed of rings C, strung horizontally upon vertical tie-rods D, with distance-washers D' between the rings C, the tie-rods D being secured at either end to channel-rings E, which, together with the filter-cloths A, inclose an annular space F, forming the chamber to which the filtered liquid passes. The lower channel-ring E in each cylinder B is secured either to the bottom A$^2$ of the casing A' or to an open framework-support G when the bottom of the casing is intended to be opened periodically to remove deposit therefrom. The filter-cloths A are secured upon the skeleton cylinder B in the manner shown at Fig. 9 by clamping-rings I, which, by means of bolts and nuts $x$, clamp the cloth A between the channel-irons and the rings I.

As an alternative we may arrange the filter-cloths A one on each side of a corrugated metal cylinder B', corrugated vertically or circumferentially, or both, the cloths being arranged one on the outer surface and one on the inner surface of the cylinder. This cylinder is secured at both ends by means of bracket-pieces or angle-iron rings H, as shown at Figs. 3 and 4, to metal rings I, to which the cloths are attached, the latter rings being at right angles to the ends of the cylinder B' and the whole forming a filtering-cylinder with an annular space between its outer and inner cloths, as before described. Either end of each cloth is secured either to the corrugated cylinder or between the face of the ring I and the angle-iron ring H. As a further modification instead of a single corrugated cylinder two perforated concentric cylinders B$^2$, a short section of which, so as to show the cross-section thereof, is shown in Fig. 5, of such relative diameters and so placed as to leave an annular space between them may be employed, against which the filter-cloths A bear, and these perforated cylinders B$^2$ may be formed with flanges B$^3$ at top and bottom or have these flanges attached to them, by which they are secured to the top and bottom clamping-rings I. Instead of the corrugated or perforated cylinders vertical laths J, of metal, may be strung upon horizontal rings K, the whole being secured to the top and bottom rings by eyebolts, as shown in dotted lines at Fig. 6, or otherwise, or the laths J, instead of being strung upon the horizontal rings K, may be fitted into notches in these rings.

The filtering-cylinders, constructed in the manner described, under either of the modifications are arranged concentrically within the cylindrical casing A and secured to the bottom of the casing or the support before mentioned by bolts passing through the lower rings or by other means.

The liquid to be filtered is admitted by any ordinary means to the casing A' at X and surrounds the filtering-cylinders, so as to act on the outer surface of each cloth and filter through to the annular space between these cloths, whence the clarified liquid is led off from each cylinder by a pipe M, carried through the side of the casing and provided with a cock N. On the upper end of the filter-casing A' a vertical shaft O is carried downward through the center of the cover A³, and on the inner end of this shaft O, within the casing, a number of radial arms P are secured, from which depend between the filtering-cylinders at right angles to the radial arms a number of rods or arms Q, carrying brushes R or scrapers, or both, corresponding to the number of filtering-cloths, these arms P, and with them the brushes R, being revolved constantly or intermittently around the filter-cloths A to clean the cloths by the rotation of the central shaft, which may be provided outside of the casing either with toothed gearing or belt-pulleys, so that it can be rotated from any source of power. The rods Q are centered in the radial arms P at the top and in a ring S at the bottom and are pressed toward the filter-cloths by having a portion of their length equal to the length of the brushes carried thereby formed eccentric to the center journals or supports revolubly supported in the rings S and arms P, the upper ends of such rods being provided with square heads to receive a suitable wrench, all as shown in Fig. 7, whereby the brushes may be brought to bear with a greater or less pressure against the cloths, or any other suitable device of any of the well-known forms of construction used for such purposes may be used in place of this eccentric adjustment for keeping such brushes pressed against the filter-cloths, so as to thoroughly clean them when moved. The cover of the casing is provided with a long narrow opening T, covered by a plate U, as shown in Figs. 10 and 11, which is normally closed and from which the brushes can be adjusted when the said cover-plate is drawn back, the radial arms P being in turn brought under the opening for this purpose. The construction of the brushes and adjusting device is shown particularly at Figs. 7 and 8, the brushes R being connected to the rods Q by straps R' and being guided in slots P' and S' in the radial arms P and rings S, respectively. The brushes and rods are preferably set at an angle to the vertical in order the better to brush the deposited matter to the bottom of the casing.

When it is desired to clean out the entire filter, clean water or steam may be admitted into each filtering-cylinder by the pipes, which normally form the outlets, the water or steam passing through the cloths in the reverse direction to the flow of the liquid during filtration.

The apparatus is equally adapted for filtration when placed so that the axis of the cylinder is horizontal. Instead of revolving the brushes the brushes may be adjustably secured between the stationary support G and the cover A³ of the casing, and the filtering-cylinders may be secured upon the radial arms P or upon a disk on the vertical shaft O, the lower channel-rings E being provided with rollers which run upon rails on the support G.

A filter constructed as described presents the following advantages, viz: The arrangement of the cylinders one within the other provides great filtering area, and the absence of any central spindle dispenses with the necessity for packing, while admitting of the ready removal of any cylinder without disturbing the others should a filter-cloth burst. The steam-jacketing of the casing A', together with the disposal of the filtering-cylinders within said casing, admits of the unfiltered liquid being heated to facilitate filtration. The arrangement of the filtering-cylinders so as to leave a space between them, open at one end, is in order that brushes R or scrapers may be inserted between the filtering-surfaces of two adjacent cylinders to clean the cloth by constant or intermittent rotation, no toothed gearing being necessary within the casing A' for this purpose.

Having thus described our invention, what we claim, and desire to secure by Letters Patent, is—

1. In a device of the class described, the combination with a cylinder B composed of a series of horizontal rings C, strung upon vertical tie-rods D, and spaced apart by washers D', the whole being bound together at the ends by channel-rings E against which nuts on the ends of the tie-rods bear, of filter-cloths A on the outer and inner peripheries of the metal skeleton secured at both ends to the channel-rings E by clamping-rings I, thus forming an annular chamber or chambers into which the filtered liquid passes, substantially as described.

2. In a device of the class described, the combination with a casing A', of annular hollow filtering-cylinders arranged concentrically and secured upon a support G, filtering-cloths A upon the inner and outer peripheries of the skeleton cylinders, chambers F in each cylinder formed by means of the cloths A and end rings, pipes taken from the common chamber of each cylinder separately, and a space between the cylinders open at one end, substantially as shown and described and for the purposes set forth.

3. In a filtering apparatus the combination with brushes for cleaning the filter-cloths, of means for adjusting the brushes to take up wear or give any desired degree of pressure upon the surface of the filter-cloths, said means consisting of eccentric-rods Q centered in the radial arms P and in a ring S and dapted to bear upon the backs of the brushes to which they are connected by straps R', the brushes being guided in slots P' in the radial arms and slots S' in the ring S and the adjustment being obtainable through a long slot in the cover normally closed by a sliding plate, substantially as described.

In witness whereof we have hereunto set our hands in presence of two witnesses.

DAVID BLACK.
JAMES McLUCKIE WRIGHT.

Witnesses:
WALLACE FAIRWEATHER,
JNO. ARMSTRONG, Junr.